Nov. 5, 1929.         J. R. SNYDER         1,734,695
                      SHOCK ABSORBER
              Filed Aug. 11, 1924    2 Sheets-Sheet 2
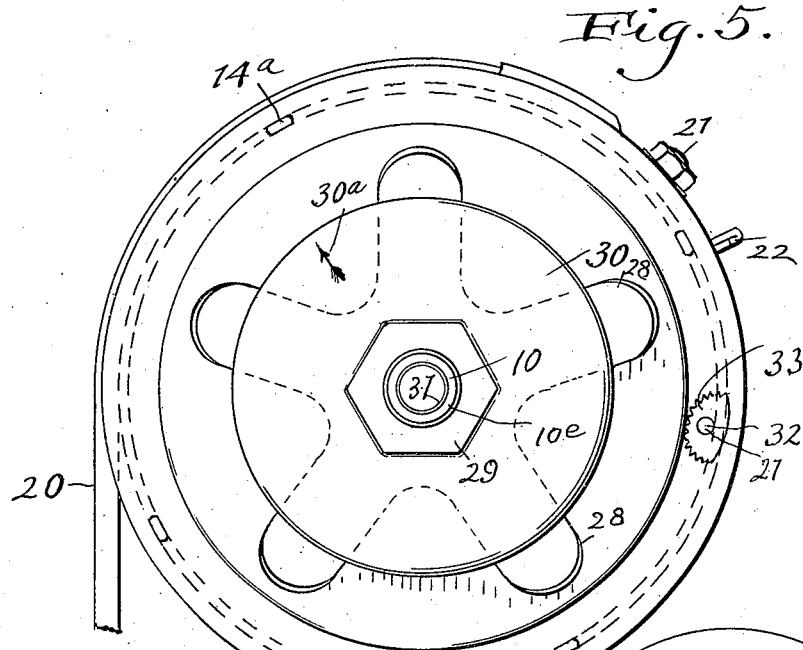
Fig. 5.
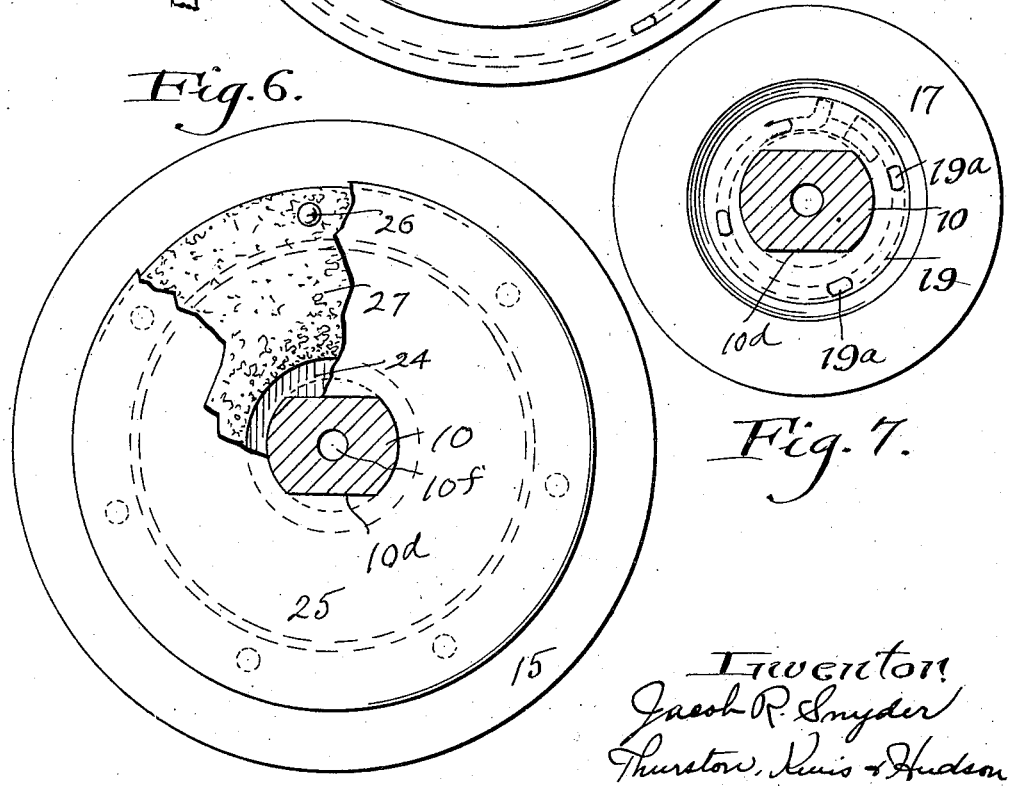
Fig. 6.
Fig. 7.

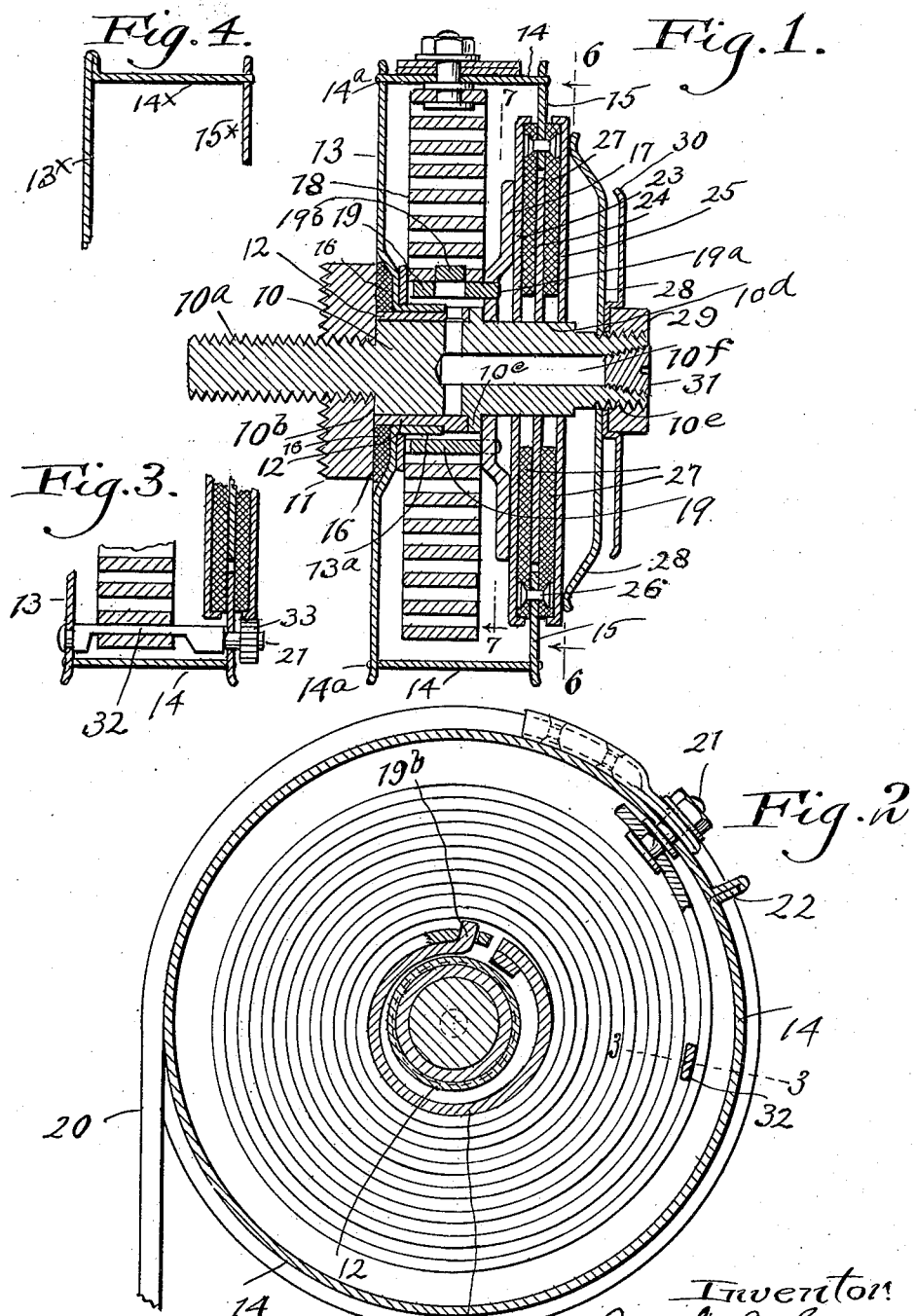

Patented Nov. 5, 1929

1,734,695

UNITED STATES PATENT OFFICE

JACOB R. SNYDER, OF CLEVELAND, OHIO, ASSIGNOR TO THE STAR REBOUND CONTROLLER COMPANY, OF CLEVELAND, OHIO, A CORPORATION OF OHIO

SHOCK ABSORBER

Application filed August 11, 1924. Serial No. 731,480.

This invention relates to shock absorbers adapted especially for use on motor vehicles.

More particularly, the invention relates to shock absorbers of the frictionally retarded type and comprising a frictionally retarded drum or other rotary member onto which the strap is adapted to be wound and from which it is adapted to be unwound, the object of the invention being to provide a shock absorber of this type which is inexpensive in construction, and at the same time highly efficient in action, and which possesses to a high degree the feature of durability.

The invention may be briefly summarized as consisting in certain novel details of construction, and combinations and arrangements of parts which will be described in the specification and set forth in the appended claims.

In the accompanying sheets of drawings wherein I have shown an embodiment of the invention which operates with high efficiency, Fig. 1 is a sectional view through the shock absorber with the section taken parallel to the axis thereof; Fig. 2 is a sectional view with the section taken at right angles to the section of Fig. 1, or transversely to the axis; Fig. 3 is a detail sectional view substantially along the line 3 of Fig. 2; Fig. 4 is a detail view illustrating a slight modification in the form and manner of constructing the rotary drum; Fig. 5 is a side elevation of the shock absorber; Fig. 6 is a sectional view substantially along the line 6—6 of Fig. 1; and Fig. 7 is a sectional view substantially along the line 7—7 of Fig. 1.

Referring now to the drawings, 10 represents a so-called center bolt by which the rotating and other parts of the shock absorber are supported, and by which it may be secured to the chassis frame of a motor vehicle by means of a fitting applied to the reduced threaded end $10^a$ of the center bolt, this fitting adapted to engage a nut 11 which is screwed onto the reduced end, up against the shoulder $10^b$. Fitted on the center bolt and extending from the shoulder $10^b$ to a flange-like shoulder $10^c$ is a bushing 12 of bronze or other suitable wear resisting material, and rotatable upon this bushing is a drum which may be formed from stamped or pressed sheet metal, and in the form shown in Fig. 1 is composed of three parts, namely, a side member 13 having at the center an inwardly bent flange constituting the bearing portion $13^a$ engaging the bushing 12, and additionally the drum as shown in Fig. 1 comprises a peripheral portion in the form of a band 14 and a relatively short side portion in the form of an annulus 15 which extends a short distance inwardly from the peripheral portion. When the drum is thus formed, the three parts 13, 14 and 15 can be fastened together by providing along the edges of the band 14, lugs $14^a$ adapted to extend into openings of the side members 13 and 15, and by upsetting these lugs.

It is not essential, however, that the drum be formed of three separate pieces, and in Fig. 4 I show a modification wherein the side member $13^x$ and the band $14^x$ are formed in one integral piece, or if the parts are formed of separate pieces, they may be fastened together in different ways than illustrated.

Between the inner or hub portion of the drum and nut 11, a packing of felt 16, or other suitable material may be utilized to prevent loss of lubricant at this point.

At the right of the shoulder forming flange $10^c$ of the center bolt the latter has a portion $10^d$ which is flattened or otherwise made non-circular, and non-rotatably fitted on this portion and bearing against the flange $10^c$ of the center bolt is an abutment plate 17, which in this instance performs two chief functions, one of which is to resist the inward pressure of certain friction members to be referred to, and the second of which is to form a support for the inner end of the spiral spring 18 which is housed within the drum, as illustrated. For the purpose of supporting the spring 18, this abutment plate is provided with a tubular inwardly extending flange 19 which surrounds the bearing flange $13^a$ of the drum. This tubular member may be secured to the abutment plate by providing lugs $19^a$ at its outer end and extending these lugs through openings in the abutment plate and upsetting the lugs (see Fig. 7). The inner end of spring 18 may be secured to this tubular member in any suitable way, but in this instance it is provided with an outwardly extending tongue 19ᵇ over which the inner end of the spring is hooked. This tubular member may be formed from flat stock, in which event one end portion will be caused to overlap the other (as shown in Fig. 2) so that in section or in end elevation it is of spiral form so as to provide a continuous support for the innermost convolution of the spring when the spring is tightened or wrapped up.

The outer end of the spring is secured to the band 14 of the drum, as is also the strap 20 which is adapted to be wound onto and unwound from the drum, and adapted to be attached to the axle of the vehicle, assuming that the shock absorber is employed for motor vehicle use. The outer end of the spring and the inner end of the strap may be secured to the band or peripheral portion 14 by a single bolt 21, rivet, or equivalent fastening device, and to prevent liability of the strap being extended in the wrong direction around the drum, the band 14 may be provided near the bolt 21 with a protuberance 22 which can be formed by bending upwardly the ends of the strap from which the band is formed, and by welding them or otherwise securing them together. This feature, however, is not claimed herein, but in a prior application.

It will be seen from the construction so far described, that when the strap is pulled out it will rotate the drum in one direction and wind up the spring, and when the pull on the strap is released the spring will rotate the drum in the opposite direction and wind in the strap.

To frictionally retard the rotation of the drum in both directions, the following novel construction is provided: Three stationary friction disks 23, 24 and 25 are fitted onto the non-circular portion 10ᵈ of the center bolt in spaced relation, the inner disk 23 bearing against the abutment plate 17, as illustrated in Fig. 1, and the middle disk 24 being in alignment with the annulus 15 forming a portion of one side of the drum. Additionally there is secured to opposite sides of the annulus or drum side member 15 by rivets 26, two disks 27, of suitable friction material such as oil impregnated wood or ordinary brake lining material. These disks extend inwardly from near the outer periphery of disks 23 and 25 to a point near the center bolt. It will be seen, therefore, that when the drum is rotated, these disks 27 of friction material are also rotated in engagement with the stationary friction disks 23, 24 and 25. In other words, with this construction, since the disks 27 are engaged on both sides, there are eight relatively movable contacting surfaces at which the friction is created to retard the rotation of the drum. The stationary and relatively movable friction members are pressed yieldingly together by suitable means, in this case in the form of a star spring 28 which is non-rotatably fitted onto the center bolt and is pressed against the outermost stationary friction disk 25 by a nut 29 which is screwed onto the threaded end 10ᵉ of the center bolt. In this instance the disk 30 conceals the major portion of the star spring and is preferably cupped to receive a portion of the nut 29 so as to rotate with it. In practice this disk is provided with an indicator such as illustrated at 30ᵃ in Fig. 5, to indicate by its position with reference to the star spring the tension imposed in the latter.

Lubricant is preferably supplied to the interior of the drum to lubricate the convolutions of the spring, and for this purpose the center bolt is provided with a passageway 10ᶠ, the outer end of which is normally closed by a plug 31, and the inner end of which communicates with one or more openings extending through the bushing 12 so that the lubricant can be forced into the drum.

A bridge piece 32 (see Fig. 3) is extended between the side members of the drum a suitable distance from the bolt or rivet 21 to support the outer convolution of the spring so as to keep the spring substantially central in the housing and prevent it bending and therefore crystallizing adjacent the point where it is attached to the drum. One end of this bridge piece is in this instance extended to form a support for a cam shaped member 33 having a toothed periphery and adapted to engage the outer portion of friction disk 25 to temporarily hold the drum against turning so as to permit shipment with the spring wound up to the desired extent. When the shock absorber is applied to a car, this device is no longer needed and may be removed.

The major portion of the parts of the shock absorber can be stamped from sheet metal, and they can be blanked out and shaped in one operation. Additionally the construction is such that they can be readily assembled so that the cost of manufacture and assembly is relatively low. Further, it is to be noted that there is no unbalanced lateral pressure. On the other hand, the lateral thrust created by the star spring is taken up by the abutment plate 17, and the drum itself is relieved of lateral pressure, it being necessary for the bearings to sustain only the load on the drum created by the pull of the strap.

In operation, when the device is applied to a motor vehicle, the drum is rotated first in one direction and then the other, rotation in one direction being caused by the spring to wind the strap thereon, and the rotation in the opposite direction being produced by the pull on the strap, during the rebound stroke, both movements being frictionally retarded by the friction members under the action of the star spring which can be adjusted, as previously stated, to vary the degree of friction.

I do not desire to be confined to the precise details or arrangements shown, but aim in my claims to cover all modifications which do not involve a departure from the spirit and scope of my invention.

Having described my invention, I claim:

1. In a shock absorber, a stationary center bolt, a drum, a spring for rotating the drum in one direction, a strap adapted to be wound onto and unwound from the drum, said drum having one side provided with a bearing portion and friction means on the opposite side of the drum.

2. In a shock absorber, a drum, a strap adapted to be wound onto and unwound therefrom, a spring for rotating the drum in one direction, an abutment on the inner side of one side of the drum, friction members on opposite sides of said side of the drum, spring means for pressing said members together and a journal bearing supporting the opposite side of the drum.

3. In a shock absorber, a stationary center bolt, a drum, a spring for rotating the drum in one direction, a strap adapted to be wound onto and unwound from the drum, said drum being rotatable in opposite directions on the center bolt and having one side provided with a bearing portion co-operating therewith, a plurality of friction members on the opposite side of the drum, part of said friction members being rotatable with said side of the drum and part being stationary.

4. In a shock absorber, a drum having side members, one of which is adapted for rotatably supporting said drum, means for rotating said drum in opposite directions, and friction members adapted to resist rotation of said drum, part of said friction members being secured to the other side member.

5. In a shock absorber, a drum having side members, one of which is adapted to rotatably support said drum while the opposite side member is free at its inner portion, means for rotating said drum in opposite directions, friction members secured to the inner free portion of said side member and rotatable therewith, and stationary friction members cooperating with said rotatable friction members to resist rotation of said drum.

6. In a shock absorber, a drum having parallel side members, one of which is provided with a lateral extension for rotatably supporting said drum, and cooperating friction members for resisting rotation of said drum, some of said members being secured to the other of said side members and rotatable with the latter.

In testimony whereof, I hereunto affix my signature.

JACOB R. SNYDER.